Feb. 24, 1959 C. L. CUCCIA 2,875,272

COLOR SYNCHRONIZING CIRCUIT

Filed May 28, 1954

INVENTOR.
Carmen Louis Cuccia
BY
[signature]
ATTORNEY 2,875,272

COLOR SYNCHRONIZING CIRCUIT

Carmen Louis Cuccia, Princeton, N. J., assignor to Radio Corporation of America, a corporation of Delaware Application May 28, 1954, Serial No. 433,091

The terminal fifteen years of the term of the patent to be granted has been disclaimed 10 Claims. (Cl. 178—5.4)

Figures 1, 2, 3:
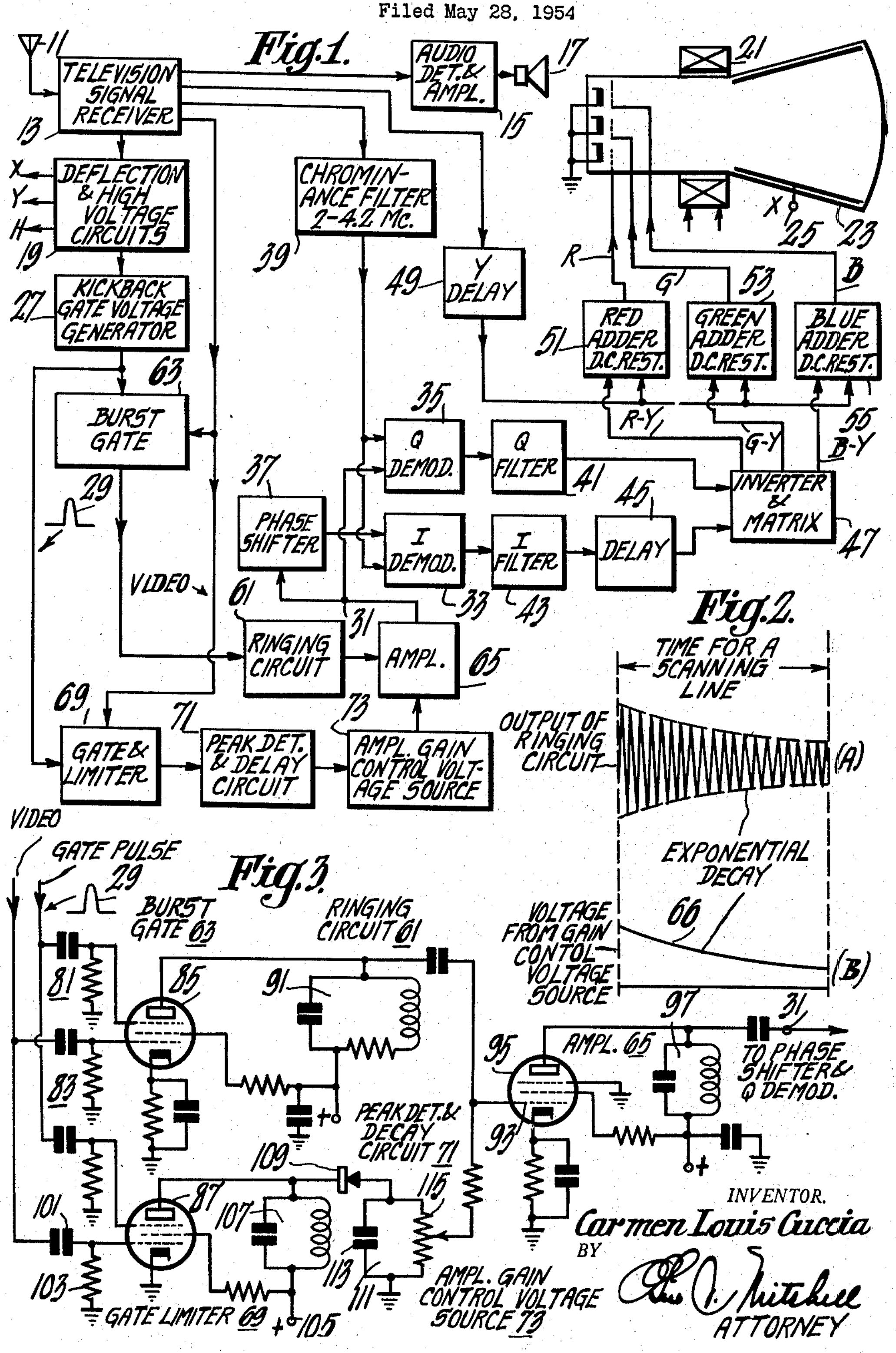

The present invention relates to signalling circuits, and more particularly to color synchronization of the type employed in color television receivers.

Color television provides the reproduction on the viewing screen of a receiver of not only the relative luminescence and brightness but also the color hues and saturations of the details of the original scene. Complete cooperation between the transmitter and receiver is essential in the successful operation of television equipment. As a result, much emphasis is placed on the development and utilization of synchronizing methods. This is particularly true in color television wherein not only it is necessary to maintain accurate deflection scanning but it is also necessary to maintain accurate synchronism in the timing of color selection.

The electrical transfer of images in color may be accomplished by additive methods. Additive methods produce natural color images by breaking down the light from an object into a predetermined number of selected primary or component colors.

Color images may be transferred electrically by analyzing the light from an object into not only its image elements, as is accomplished by normal scanning procedure, but by also analyzing the light from elemental areas of the image into selected primary or component colors and thereby deriving therefrom a signal representative of each of the selected color components. A color image may be then reproduced at a remote point by appropriate reconstruction from a component color signal train.

The method proposed for transmitting a color television picture is one based on a set of standards which were authorized by the Federal Communications Commission on December 17, 1953. These standards describe a component waveform which contains both the luminance information and the chrominance information in addition to synchronizing information which is necessary for proper synchronization of the receiver and the transmitter.

Consider now in more detail the precise nature of this color television signal which conforms to the aforementioned NTSC standards. These standards also prescribe that the method of transmission shall be a compatible method of transmission; that is, that the signal produced by the color television system should be suitable for providing service to the black-and-white receivers.

One approach for providing a method of producing a luminance signal from the output of a color camera is that based on utilizing component colors of suitable strength to describe the color image. Note that if the signal obtained from a pickup apparatus is one which corresponds to only one of the component primary colors, certain colors would be rendered on black and white receivers in inappropriate tones of gray. For example, if the signal from a green camera tube were to control black-and-white receivers it would be found that both red lips and blue skies would be too dark in the black-and-white images because the green pickup tube has very little response for either red or blue light. It is possible, however, to produce a very reasonable luminance signal by adding the signals from the red, green, and blue camera tubes in proportion to the relative luminosity of the primary colors involved. It is of importance to understand that strictly speaking, brightness is a psychological sensation not susceptible to exact measurement. On the other hand, luminance, which can be measured by taking into account the spectral sensitivity of the typical eye, indicates the strength of the stimulus which controls the brightness sensation and can be measured in relative units.

The three primary colors recommended as standard for color television do not appear equally bright because they are located in different parts of the spectrum and hence stimulate the brightness sensation by different amounts. If the three primaries are mixed in the right proportions, it is found that the green primary, which is located at the center of the visible spectrum, accounts for 59% of the brightness sensation, while the blue and red primaries account for only 30% and 11% respectively. The conclusion may be drawn that it is possible to make a color television system compatible in the sense of providing service to black-and-white receivers by cross-mixing the red, blue and green primary signals to produce a monochrome signal Y according to the equation $$Y=0.30R+0.59G+0.11B \quad (1)$$

This signal should be generated in accordance with the existing scanning standards; i. e., 525 lines, 60 fields per second, and 30 frames per second, and should be treated exactly like a standard monochrome signal with respect to bandwidth and the addition of synchronizing and blanking pulses. Note that this type of a signal is only a reasonable one for connecting a color camera to a black-and-white receiver. In order to produce color pictures for color television transmission to a color receiver, it is necessary to produce at least two other independent signals in addition to the luminance signal since color involves three independent variables, and if the requirement of compatibility is to be satisfied, it is necessary to find means for transmitting these additional signals in a standard broadcast channel without interfering with the monochrome signal.

Since color has only three variables, it is reasonable to suppose that it should be possible to achieve the desired results with only three independent signals. However, in order to satisfy so-called reverse compatibility, that is the color receiver should be capable of producing a black-and-white picture from a standard monochrome signal, it is more convenient to deal with color difference or chrominance signals. These chrominance signals are designated $R-Y$, $G-Y$, and $B-Y$ and indicate how each color in the televised scene differs from the monochrome color of the same luminance. In one type of transmission it would be possible to build a transmission network which transmits the appropriate amounts of $R-Y$ and $B-Y$ signals; the $R-Y$ and $B-Y$ signals may be then passed through a matrix system in the receiver to recover the $G-Y$ signal and by combining these color difference signals with the luminance signal the proper color signals may be applied to color reproducer to produce a resonant color picture.

In an actual method of transmission which satisfies the FCC standards, it is convenient to employ another group of signals for the actual transmission. The second group of signals is also made up of color difference signals and is useful in that it makes allowance for the acuity of the eye to various colors and also is more suitable for utilizing the 6 mc. channel which is standard for monochrome picture signal transmission with its associated frequency modulated sound signal.

The two signals actually employed for the signal transmission are called the I and Q signals respectively. The I signal is a wide band signal yielding information along the orange-cyan axis while the Q signal is a narrow band signal describing green-purple axis information. By proper utilization of the I and Q signals, the color information can be recovered at the receiver.

Consider now the method of sending the I and Q signals. It is well known that a sine wave can carry two independent sets of information by modulating it in amplitude with one set and in phase with the other or, what is essentially the same thing, by separating the sine wave into two components and amplitude modulating each component with one set of information. Each modulation can then be recovered by heterodyning the modulating wave with a sine wave having the same frequency and phase as the carrier component carrying the desired modulation. This process is sometimes called synchronous detection and must not be confused with other forms of detection which recover the modulation envelope.

Therefore in practical operation, a color subcarrier is used; this color subcarrier is modulated by the I and Q signals respectively. In practice the frequency designated for the color subcarrier is 3.58 mc. This is a frequency substantially equal to that of an odd multiple of one-half the line scanning frequency. Since the spectral components of a standard television signal occur in groups at intervals of the line scanning frequency, by choosing the color subcarrier frequency at an odd multiple of one-half the line scanning frequency the color information will be interspersed with that of the luminance and picture information and a minimum of signal confusion will result.

The standard television broadcasting channel with an upper limit of almost 4½ mc. with respect to the carrier position is assigned for transmission of the video spectrum. However, the frequency of a color subcarrier is 3.58 mc. This imposes some restriction on the type of signal which can therefore be included in the chrominance and luminance signal. Whereas the video channel as measured from the carrier is approximately 4½ mc. wide, in practice the spectral amplitudes are caused to reduce in magnitude sharply to zero beyond 4.1 mc. so that an FM sound modulated carrier centered at 4½ mc. can be included in the channel. It is therefore evident that if double sideband information is to be included with the color subcarrier, the color information involved can only have sidebands up to ½ mc. removed from the upper side of the color subcarrier (that is to say, for the upper sideband). For the lower sideband, of course, the color subcarrier information can be included substantially into the group of components which describe the luminance information.

In practice, it is convenient to transmit the chrominance information in the following manner. The I signal, which is a wide band signal, is included with the color subcarrier in such a way that it produces double sideband information for modulating frequencies up to approximately ½ mc. and single sideband information for frequencies in approximately the range from ½ mc. to 1½ mc. The disposition of these side frequencies is such that the single sideband information is included in the video spectrum from approximately 2.2 mc. to 3 mc. The Q signal, which is a narrow band chrominance signal, is transmitted double sideband with modulating frequencies up to approximately ½ mc. This signal, is, of course, easily included in the television picture channel.

The precise phases of the I and Q signals with regard to the general components of the complete television picture are therefore very critical. It is therefore necessary to transmit synchronizing information with the television signal. This synchronizing information is transmitted in the form of approximately 8 cycles of the 3.58 mc. signal which is located on the back porch of the horizontal synchronizing pulse. The phase of this synchronizing burst is 57° ahead of the I component phase (which leads the Q component by 90°). It can be shown that this phase is also 180° out of phase with respect to the *B—Y* component of the signal; the choice of this value permits certain simplifications in receiver design.

It is evident therefore that in the reproducer which is to display the color information, accurate use must be made of the synchronizing information to produce a properly synchronized locally generated continuous wave which is used in the processes of synchronous detection.

There are several methods whereby a signal generator in a color television receiver may be synchronized in frequency and phase by the color synchronizing burst. One is the well known method which involves the use of a phase comparator device in conjunction with the reactance tube, the phase comparator device yielding a measurement of any phase difference between the oscillator output and the color synchronizing burst and providing therefrom a control signal to the reactance tube which pulls the frequency and phase of the oscillator into synchronism. Another method is that involving what is termed "injection locking"; this method consists of injecting a synchronizing burst into the circuit of the free-running oscillator, this synchronizing burst then causing the free-running oscillator to pull into synchronism.

Another important method and one which is concerned in the teachings of the present invention is one involving ringing circuits. As has been described, the color synchronizing burst is of very short duration. It is then possible to gate this synchronizing burst from the color television signal and to use it to activate a high Q ringing circuit which then rings until the next color synchronizing burst appears at which time it is caused to ring again. The use of the ringing circuit has many advantages; one in particular is that it does not require frequency control in that the frequency and phase of the ringing signal follows precisely the frequency and phase of the energy which is used to cause the ringing. It has one disadvantage however, namely that since there usually are losses in even the highest Q circuits, the amplitude of the ringing signal will decay exponentially. It is desired that the local color signal generator in the color television receiver have a near constant amplitude output through the scanning line. The present invention is devoted to teaching an important method whereby the ringing circuit technique may be improved in a simple and direct fashion to provide an output signal which is substantially constant throughout the scanning line following the injection of the color synchronizing burst into the ringing circuit.

It is therefore an object of this invention to provide an improved ringing circuit type of color signal source in a color television receiver.

It is yet another object of this invention to provide a means whereby the output of a burst-pulsed ringing circuit may be transformed into a signal of near constant amplitude.

It is yet another object of this invention to provide a gain control circuit for an amplifier which is devoted to the amplification of the output of a ringing circuit.

It is still another object of the invention to provide an amplifier circuit with burst-pulse controlled gain.

It is yet another object of this invention to provide an improved type of ringing circuit for use in a color television receiver.

It is a further object of this invention to provide a simplified method for producing a constant amplitude signal from a ringing circuit of moderately high Q.

According to this invention it is recognized that when a color synchronizing burst is utilized to excite a ringing circuit the voltage developed across the ringing circuit will decay exponentially. By using a compensating exponential gain variation in an amplifier circuit following the ringing circuit, the output of the amplifier circuit may be caused to have substantially constant amplitude.

In one form of the invention the color synchronizing burst is gated and fed through a limiter circuit into a peak detector circuit which is designed to yield an exponentially decaying voltage whose maximum amplitude is a function of the amplitude of the limited burst. This exponential decaying voltage is then utilized to exponentially increase the gain of an amplifier stage which accepts the output of a ringing circuit into its input circuit, the exponential rise in gain thereby compensating for the exponential decay of the voltage across the ringing circuit.

In still another form of the present invention, the horizontal synchronizing pulse may be gated into a limiter-peak detector circuit to provide an exponentially decaying signal which can be utilized for amplifier gain compensation in conjunction with the ringing circuit.

Other and incidental objects and advantages of this invention will become apparent upon a reading of the following specification and an inspection of the accompanying drawing in which:

Figure 1 shows a block diagram of a color television receiver employing the present invention;

Figure 2*a* shows the output signal of a ringing circuit during a scanning line;

Figure 2*b* shows the required exponential decay voltage required from a gain control voltage source for amplifier gain compensation; and Figure 3 shows a schematic diagram of the circuit features relating to the present invention which are described in Figure 1.

Before turning to the description of the embodiments of the present invention, consider first the nature of a ringing circuit. Such circuits have been studied by many authors in many books and publications; it has long been well known by those skilled in the art of the communications field that when a parallel resonant circuit of the type, for example, having a capacitance in one branch, and a resistance in series with an inductance in a second branch, is excited by a pulse, the current through either branch of the parallel resonant circuit is of the form $$i=\frac{E}{\omega L}\left(\frac{R}{\omega L}\sin\omega t+e^{-\frac{Rt}{L}}\right) \quad (2)$$

where E is the amplitude of the pulse, L and R refer to the inductance and resistance, and $\omega$ is the resonant frequency of the resonant circuit. This equation is derived, for example, on pages 267 and 268 of the "Principles of Radio Communication," by J. H. Morecroft, published by John Wiley and Sons in 1921. As can be seen from Equation 2 that as a result of pulse excitation, a sine wave is developed across the parallel resonant circuit. The amplitude of this sine wave will decrease in accordance with the amplitude of the decrement $R/L$. When the solution is extended to include the case where the excitation is provided by a short burst of oscillatory energy at the reconant frequency of the ringing circuit instead of merely a pulse, the resultant expression becomes somewhat more complicated; however, its general form does not change with regard to the decay of voltage across the ringing or resonant circuit. As in the case of a pulse excited parallel resonant circuit, the amplitude developed across a burst excited parallel resonant circuit will decay in accordance with the decrement $R/L$. The decrement $R/L$ will be recognized as yielding a portion of the expression of the Q of the circuit namely $$Q=\omega L/R \quad (3)$$

Thus, if the Q of the circuit is very high, the exponential decay, though present, will not be rapid and by using sufficiently high Q, it might be possible to devise a ringing circuit which would yield almost constant amplitude for the duration of a scanning line succeeding the color synchronizing burst. However, it is more economical to build a lower Q ringing circuit for use in color television receivers; in fact the teachings of the present invention permit the utilization of a relatively or moderately low Q ringing circuit in combination with a special gain varied circuit which, as will be described, will accept the exponential varying gain control voltage from the ringing circuit and transform it after amplification into an output voltage of substantially constant amplitude. Since the voltage across the ringing circuit decreases exponentially, the gain of a succeeding amplifier must increase in a manner complementary to this exponential decay. The following specifications will discuss circuits which can provide in a simple and straight forward fashion this type of complementary gain response.

Consider now a block diagram as shown in Figure 1 of the color television receiver which utilizes the present invention. In the description of the diagram of Figure 1, the present invention will be described in its more broad aspects. A detailed description of one embodiment of the present invention will be described in connection with Figure 3.

As is shown in Figure 1, the incoming color television signal arrives at the antenna 11 and is impressed on the television signal receiver 13. The operation of the television signal receiver 13 is such whereby the television signal information including the sound modulated carrier is recovered. The television signal receiver 13 combines the well known functions of first detection, intermediate frequency amplification, second detection, and such secondary functions as automatic gain control and interference suppression. For a discussion of the operation of many of these features in a television signal receiver see, for example, the paper by Antony Wright entitled "Television Receivers" in the March 1947 issue of the RCA Review.

At the output of the television signal receiver, several circuits utilized the information involved. In one circuit using, for example the well known principles of intercarrier sound, the sound information is extracted from the color television signal and amplified in the audio detector and amplifier 15; the output of the audio detector and amplifier 15 is then applied to the loud speaker 17.

In another branch coupled from the television signal receiver 13 the television signal deflection information contained in the television signal is applied to the deflection circuits and high voltage circuit 19; these circuits provide the horizontal and vertical deflection signals to the yokes 21 of the color kinescope 23, in addition to the high voltage to the ultor whose connection is designated as 25. The deflection circuits and high voltage circuit 19 are also utilized to energize the kickback gate voltage generator 27 which in many systems may be merely the kickback voltage winding on the high voltage circuit transformer. This kickback gate voltage generator is adjusted to yield a pulse 29 having a duration time substantially that of the color synchronizing burst. At the terminal 31 there will be caused to appear a 3.58 mc. subcarrier voltage of constant amplitude which will be suitable for the synchronous detection of the color difference signal. This voltage is applied to the Q demodulator 35. By passing this voltage at the terminal 31 through the phase shifter 37 a signal is also provided to the I demodulator 33 which is suitable for the synchronous detection of the I signal. The color television signal issuing from the television signal receiver 13 is then passed through the chrominance filter 39 which has a pass band from substantially 2 to 4.2 mc. thereby eliminating the lower frequency luminance information. The filtered color television signal is then applied simultaneously to the Q demodulator 35 and the I demodulator 33.

The output of the Q demodulator 35 is impressed on the Q filter 41 which has a pass band from approximately zero to ½ mc. The output of the I demodulator is passed through the I filter 43, which has a pass band from approximately zero to 1.5 mc., through the delay line 45.

The output of the Q filter 41 into the delay line 45 is passed to the inverter and matrix 47 in which the I and Q signals are inverted and matrixed to produce simultaneously the $R-Y$, $G-Y$, and $B-Y$ signals.

The output of the television signal receiver then furnishes the complete color television signal, which may also be referred to as the Y signal since it contains luminance information; the Y signal is passed through the Y delay 49 to the red adder and D.-C. restorer 51, the green adder and D.-C restorer 53, and the blue adder and D.-C. restorer 55 in which the Y information is combined respectively with the $R-Y$, the $G-Y$, and the $B-Y$ signals to form the red, green, and blue information which is appropriate grids of the color kinescope 23.

Consider now the portion of the circuit in Figure 1 which produces the local signal appearing at terminal 31 utilizing the ringing circuit 61 in accordance with the principles taught by the present invention. The color television signal is applied to the burst gate 63 to which is also applied the kickback pulse 29 which opens the burst gate during the duration of the color synchronizing burst and supplies the gated burst to the ringing circuit 61. The output of this ringing circuit 61, is, in a manner which has been described, a ringing signal having the frequency and phase prescribed by the burst and having an exponentially decaying amplitude during the time for a scanning line following the burst as is illustrated in Figure 2*a*. The output of the ringing circuit 61 is applied to the amplifier 65 whose output is the terminal 31.

In the particular circuit being described, the teachings of the present invention require that the amplification of the amplifier 65 vary in a fashion complementary to the exponential decay characteristic of the signal produced by a ringing circuit. If the gain versus bias voltage of the amplifier 65 varies linearly though inversely, then it will merely be necessary to supply an exponential decay voltage of the type shown in Figure 2*b* so that at the start of the scanning line with the gain control voltage at a maximum the gain of the amplifier 65 will be at a minimum. As this gain control voltage shown by the curve 66 in Figure 2*b* decreases exponentially, the gain of the amplifier 65 will increase though in a manner inverse to the curve 66 by proper matching of the exponential decay curve 66 with the exponentially decaying amplitude of the output of the ringing circuit, whereby the signal appearing at the output terminal 31 will be maintained constant during the scanning line. There are many methods of producing the exponential decay curve 66; one of the simplest approaches is to use an RC network which has a time constant which matches that required for complementary gain comparison and to which is applied to voltage of proper initial magnitude. One way in which this voltage of proper initial magnitude can be supplied prior to the start of the scanning line, is to apply the color television signal to the gate and limiter circuit 69 to which is also applied the kickback pulse 29. There are at least two signals between scanning lines which may be utilized for developing a voltage for use in compensating the gain control of the amplifier 65. One is a voltage derived from the horizontal synchronizing pulse and the other is a voltage derived from the color synchronizing burst.

Consider the application where the voltage is derived from the color synchronizing burst. The gate and limiter circuit 69 then accepts the television signal and both gates and limits it to provide an output signal at the terminal 70 which will be a gated amplitude-limited burst. This gated-amplitude limited burst is then applied to the peak detector and decay circuit 71 which measures the peak of the signal and applies it to an RC network which forms the decay circuit having proper decay characteristics to yield complementary gain compensation. The output of the decay circuit 71 is applied to the amplifier gain control voltage source 73 which controls the gain of the amplifier 65.

Figure 3 shows a schematic diagram of a circuit in which complementary gain control of the ringing circuit 61 shown in Figure 1 may be accomplished. Here the gate pulse or kickback pulse 29 is applied simultaneously through suitable RC networks 81 and 83 to the third grids of the vacuum tubes 85 and 87 respectively. The video signal or color television signal from the television signal receiver 13 is applied to the first control grids of the vacuum tubes 85 and 87. It is to be noted at this point that the precise orientation of grids on which the video and gate pulses are applied may be interchanged without detracting from the operation of the present invention. The tube 85 then operates as the burst gate 63 supplying the separated burst to the ringing circuit 91. The output of the ringing circuit 91 is applied to the control grid 93 of the amplifier tube 95 which functions in the amplifier 65. The output of the tube 95 in the amplifier 65 is the resonant circuit 97 which is tuned to the burst frequency. In the gate and limiter circuit 69 the color synchronizing burst is not only separated from the color television signal but also by utilization of one or more limiting techniques, namely by proper choice of the values of the condenser 101, and the resistance 103, and the grounding of the cathode of the tube 87 in addition to providing a very low voltage at the potential terminal 105, the tube 87 will be caused to limit the amplitude of the separated color synchronizing burst so that the voltage developed across the resonant circuit 107 during the burst will be relatively constant with the frequency of the burst, even though the video signal might be caused to vary in amplitude over a wide range of amplitudes. The signal developed across the resonant circuit 107 is then passed into the peak detector and decay circuit 71 which involves the rectifier 109 and the parallel RC circuit 111 across which a voltage is developed which is indicative of the amplitude of the separated-limited burst. The condenser 113 and the resistance 115 of the RC network 111 are designed to yield the exponential decay voltage 66 shown in Figure 2*b*. By utilizing a potentiometer for the resistance 115 and applying a suitable portion of the voltage developed across this resistor 115 into the grid circuit of the tube 95 in the amplifier 65 complementary gain control of the amplifier 65 to match the exponential decay of the ringing circuit 61 may be achieved thereby providing an output signal at the terminal 31 of substantially constant amplitude.

It is to be noted that by shifting the phase of the gating pulse 29 the horizontal synchronizing pulse may be gated and limited in the gate and limiter circuit 69 to produce a signal either across the resonant circuit 107 or across a resistance load; this signal then being utilized in the peak and detector circuit 73 for complementary gain control of the amplifier 65.

Having described the invention, what is claimed is:

1. In a color television receiver, said color television receiver adapted to receive a color television signal, said color television signal including horizontal synchronizing pulses and a color synchronizing burst, a ringing circuit color signal source, comprising in combination, a ringing circuit, a first gating circuit, said first gating circuit including apparatus whereby said color synchronizing burst is separated from said color television signal and applied to said ringing circuit, said ringing circuit characterized in that it develops oscillations at a phase and frequency prescribed by said color synchronizing burst, said oscillations in said ringing circuit characterized in that they decay in the time interval between color synchronizing bursts according to a predetermined time versus amplitude relationship, an amplifier circuit, said amplifier circuit including an input circuit and an output circuit and a gain control electrode, means for coupling said ringing circuit to the input circuit of said amplifier circuit, a second gate circuit, a waveform generator, means for coupling said waveform generator between said second gate circuit and said gain control electrode of said amplifier circuit, said second gate circuit including apparatus for gating said color synchronizing burst into said waveform generator, and said waveform generator adjusted to supply a waveform to said gain control electrode of said amplifier circuit having proper characteristics whereby said amplifier circuit is caused to produce an oscillatory signal in said output circuit having a predetermined amplitude versus time relationship and having phase and frequency of said oscillations developed in said ringing circuit.

2. The invention as set forth in claim 1 and wherein the output circuit of said amplifier circuit includes a second ringing circuit.

3. The invention as set forth in claim 1 and wherein said second gate circuit includes means for limiting the amplitude of said color synchronizing burst.

4. In a color television receiver, said color television receiver adapted to receive a color television signal, said color television signal including horizontal synchronizing pulses and a color synchronizing burst, a ringing circuit color signal source, comprising in combination, a ringing circuit, a first gating circuit, said first gating circuit including apparatus whereby said color synchronizing burst is separated from said color television signal and applied to said ringing circuit, said ringing circuit characterized in that it develops oscillations at a phase and frequency prescribed by said color synchronizing burst, said oscillations in said ringing circuit characterized in that they decay in the time interval between color synchronizing bursts according to a predetermined time versus amplitude relationship, an amplifier circuit, said amplifier circuit including an input circuit and an output circuit and a gain control electrode, means for coupling said ringing circuit to the input circuit of said amplifier circuit, a second gate circuit, a waveform generator, means for coupling said waveform generator between said second gate circuit and said gain control electrode of said amplifier circuit, said second gate circuit including apparatus for gating said horizontal synchronizing pulse into said waveform generator, and said waveform generator adjusted to supply a waveform to said gain control electrode of said amplifier circuit having proper characteristics whereby said amplifier circuit is caused to produce an oscillatory signal in said output circuit having a predetermined amplitude versus time relationship and having phase and frequency of said oscillations developed in said ringing circuit.

5. In a color television receiver, said color television receiver adapted to receive a color television signal, said color television signal including horizontal synchronizing pulses and a color synchronizing burst, a ringing circuit color signal source, comprising in combination, a ringing circuit, a first gating circuit, said first gating circuit including apparatus whereby said color synchronizing burst is separated from said color television signal and applied to said ringing circuit, said ringing circuit characterized in that it develops oscillations at a phase and frequency prescribed by said color synchronizing burst, said oscillations in said ringing circuit characterized in that they decay in the time interval between color synchronizing bursts according to an exponential relationship, an amplifier circuit, said amplifier circuit including an input circuit and an output circuit and a gain control electrode, means for coupling said ringing circuit to the input circuit of said amplifier circuit, a second gate circuit, a peak detector and decay circuit, means for coupling said peak detector and decay circuit between said second gate circuit and said gain control electrode of said amplifier circuit, said second gate circuit including apparatus for gating said color synchronizing burst into said peak detector and decay circuit and said peak detector and decay circuit adjusted to supply a waveform to said gain control electrode of said amplifier circuit having proper characteristics whereby said amplifier circuit is caused to produce an oscillatory signal in said output circuit having a predetermined amplitude versus time relationship and having phase and frequency of said oscillations developed in said ringing circuit.

6. The invention as set forth in claim 5 and wherein said peak detector and decay circuit includes an exponential decay network, said exponential decay network characterized in that it yields an exponentially decaying voltage of suitable amplitude which may be applied to said gain control terminal or said amplifier circuit to cause the gain of said amplifier circuit to compensate for the exponential decay in the amplitude of said oscillations of said ringing circuit.

7. The invention as set forth in claim 5 and wherein said second gate circuit includes a resonant circuit, said resonant circuit responsive to the frequency of said color synchronizing burst to produce oscillations of predetermined duration.

8. The invention as set forth in claim 5 and wherein said peak detector and decay circuit includes a rectifier in series with an exponential decay network.

9. In a color television receiver, said color television receiver adapted to receive a color television signal, said color television signal including horizontal synchronizing pulses and a color synchronizing burst, a ringing circuit color signal source, comprising in combination, a ringing circuit, a first gating circuit, said first gating circuit including apparatus whereby said color synchronizing burst is separated from said color television signal and applied to said ringing circuit, said ringing circuit characterized in that it develops oscillations at a phase and frequency prescribed by said color synchronizing burst, said oscillations in said ringing circuit characterized in that they decay in the time interval between color synchronizing bursts according to an exponential relationship, an amplifier circuit, said amplifier circuit including an input circuit and an output circuit and a gain control electrode, means for coupling said ringing circuit to the input circuit of said amplifier circuit, a second gate circuit, a peak detector and decay circuit, means for coupling said peak detector and decay circuit between said second gate circuit and said gain control electrode of said amplifier circuit, said second gate circuit including apparatus for gating said horizontal synchronizing pulse into said peak detector and decay circuit, said peak detector and decay circuit adjusted to supply a waveform to said gain control electrode of said amplifier circuit having proper characteristics whereby said amplifier circuit is caused to produce an oscillatory signal in said output circuit having a predetermined amplitude versus time relationship and having phase and frequency of said oscillations developed in said ringing circuit.

10. The invention as set forth in claim 9 and wherein the output circuit of said amplifier circuit includes a second ringing circuit, said ringing circuit tuned to resonate at substantially the frequency of said color synchronizing burst.

References Cited in the file of this patent

UNITED STATES PATENTS

| | | |
|---|---|---|
| 2,645,678 | Christensen | July 14, 1953 |
| 2,653,187 | Luck | Sept. 22, 1953 |
| 2,666,136 | Carpenter | Jan. 12, 1954 |
| 2,712,568 | Avins | July 5, 1955 |
| 2,713,612 | Nero | July 19, 1955 |

OTHER REFERENCES

Introduction to Color Television, Kaufman and Thomas, Rider Publication, Receiver Diagram, page 142.